US007451001B2

(12) United States Patent
Harwood

(10) Patent No.: US 7,451,001 B2
(45) Date of Patent: Nov. 11, 2008

(54) METHOD AND SYSTEM OF CONTROLLING LIGHTING FIXTURE

(75) Inventor: Ronald Paul Harwood, 31110 Applewood, Farmington Hills, MI (US) 48331

(73) Assignee: Ronald Paul Harwood, Farmington Hills, MI (US)

( * ) Notice: Subject to any disclaimer, the term of this patent is extended or adjusted under 35 U.S.C. 154(b) by 442 days.

(21) Appl. No.: 11/188,427

(22) Filed: Jul. 25, 2005

(65) Prior Publication Data

US 2007/0018795 A1 Jan. 25, 2007

(51) Int. Cl.

| | |
|---|---|
| ***G05B 15/00*** | (2006.01) |
| ***G05B 11/01*** | (2006.01) |
| *H05B 37/00* | (2006.01) |
| *H02P 6/14* | (2006.01) |
| *F21V 21/14* | (2006.01) |

(52) U.S. Cl. ............................ 700/1; 700/19; 315/312; 318/400.26; 362/250

(58) Field of Classification Search .................. 700/19, 700/1; 315/312; 318/400.06; 340/286.02; 362/250

See application file for complete search history.

(56) References Cited

U.S. PATENT DOCUMENTS

| | | | | |
|---|---|---|---|---|
| 4,716,344 | A | 12/1987 | Newell et al. | |
| 5,059,871 | A * | 10/1991 | Pearlman et al. | 315/316 |
| 5,761,534 | A * | 6/1998 | Lundberg et al. | 710/50 |
| 5,798,921 | A * | 8/1998 | Johnson et al. | 700/94 |
| 6,160,359 | A * | 12/2000 | Fleischmann | 315/294 |
| 6,166,496 | A * | 12/2000 | Lys et al. | 315/316 |
| 6,188,933 | B1 | 2/2001 | Hewlett et al. | |
| 6,208,905 | B1 * | 3/2001 | Giddings et al. | 700/11 |
| 6,211,626 | B1 * | 4/2001 | Lys et al. | 315/291 |
| 6,331,756 | B1 | 12/2001 | Belliveau | |
| 6,459,217 | B1 | 10/2002 | Belliveau | |
| 6,459,919 | B1 * | 10/2002 | Lys et al. | 600/407 |
| 6,605,907 | B2 | 8/2003 | Belliveau | |
| 6,622,053 | B1 | 9/2003 | Hewlett et al. | |
| 6,761,470 | B2 * | 7/2004 | Sid | 362/233 |
| 6,791,284 | B1 | 9/2004 | Levy | |
| 6,859,644 | B2 | 2/2005 | Wang | |
| 2001/0047212 | A1 | 11/2001 | Hewlett et al. | |
| 2002/0047628 | A1 | 4/2002 | Morgan et al. | |
| 2002/0047648 | A1 | 4/2002 | Belliveau | |
| 2002/0048169 | A1 | 4/2002 | Dowling et al. | |
| 2002/0070688 | A1 | 6/2002 | Dowling et al. | |
| 2002/0093296 | A1 | 7/2002 | Belliveau | |
| 2002/0153851 | A1 | 10/2002 | Morgan et al. | |
| 2002/0163316 | A1 | 11/2002 | Lys et al. | |
| 2002/0171377 | A1 | 11/2002 | Mueller et al. | |
| 2002/0171378 | A1 | 11/2002 | Morgan et al. | |
| 2003/0001523 | A1 | 1/2003 | Belliveau | |

(Continued)

OTHER PUBLICATIONS

Harwood-R-J., "Use case formats: requirements, analysis, and design"Journal of Object-Oriented Programming, {J-Object-Oriented-Program-USA}, Jan. 1997, vol. 9, No. 8 abstract p. 1-2.*

*Primary Examiner*—Albert DeCady
*Assistant Examiner*—Thomas H Stevens
(74) *Attorney, Agent, or Firm*—Brooks Kushman P.C.

(57) ABSTRACT

Method and system of controlling lighting fixtures. The lighting fixtures being associated with controllable devices having features for emitting light. The control thereof may be based on a show schedule or other features used to designate desired operation of the lighting fixtures.

14 Claims, 1 Drawing Sheet

U.S. PATENT DOCUMENTS

2003/0137258 A1 7/2003 Piepgras et al.
2003/0151909 A1 8/2003 Sid
2003/0206411 A9 11/2003 Dowling et al.
2003/0208291 A1 11/2003 Belliveau
2003/0214259 A9 11/2003 Dowling et al.
2003/0222587 A1 12/2003 Dowling, Jr. et al.
2004/0017164 A1 1/2004 Belliveau
2004/0036006 A1 2/2004 Dowling
2004/0052076 A1 3/2004 Mueller et al.
2004/0141321 A1 7/2004 Dowling et al.
2004/0160198 A1 8/2004 Hewlett et al.
2004/0160199 A1 8/2004 Morgan et al.
2005/0029967 A1 2/2005 Chen et al.
2005/0035717 A1 2/2005 Adamson et al.
2005/0035730 A1 2/2005 Blum
2005/0047134 A1 3/2005 Mueller et al.
2005/0116662 A1 6/2005 Sanchez

* cited by examiner

METHOD AND SYSTEM OF CONTROLLING LIGHTING FIXTURE

BACKGROUND OF THE INVENTION

1. Field of the Invention

The present invention relates to methods and systems of controlling lighting fixtures.

2. Background Art

DMX-512 protocol refers to a protocol standard as defined by the Unites States Institute for Theatre Technology, Inc. (USITT), which is hereby incorporated in its entirety. Presently, a DMX-512 protocol controller has up to 512 channels transmitted to each of any number of connected lighting fixtures. Each of the lighting devices controlled thereby includes an address circuit which identifies the particular channel or channels that the device will take instructions from the DMX-512 console. Each of the DMX-512 controller channels has multiple levels, or amplitude settings, to produce different conditions in the connected lighting fixtures, whether they be dimmers, color mixers, etc.

One problem with the DMX-512 control process relates to transmitting a common control stream to each of the lighting fixtures. The DMX control stream may include up to 512 channels and corresponding levels depending on the number of lighting fixtures being controlled. The console continuously outputs the control stream to maintain operation of the lighting fixtures. If the operation of the lighting fixtures is to remain constant, the console continues to broadcast the control stream but without changing the level settings associated therewith, i.e., to maintain the lighting fixtures in their current state. Repeatedly broadcasting the channels and corresponding level setting unnecessarily consumes bandwidth on a communication medium used to transport the signals.

Another problem with the DMX-512 control process relates to the inability of the lighting fixtures to maintain operations in the absence of the control stream. The lighting fixtures are real-time dependent devices which require a continuous stream of instructions to maintain the operation thereof. If the command stream is interrupted or communications are otherwise lost, the lighting fixtures cease operation or otherwise return to a homed position. This can be problematic during lighting shows and other performance where continued operation of the lighting fixtures is desired.

Another problem with the DMX-512 control process relates to the inability of the console to provide feedback and other quality of service related features. The relatively continuous broadcasting of the control stream essentially consumes bandwidth and opportunities for other communications between the console and the lighting fixtures. This limits the ability of the console to ascertain telemetry and other indicators of lighting fixture operations. A lighting fixture may become inoperable without any notification or feedback being provided and without any corrective action being instigated by the console.

SUMMARY OF THE INVENTION

One aspect of the present invention relates to a lighting system. The system may include a number of lighting fixtures and a lighting control application configured to facilitate emitting instructional signals for instructing operation of the lighting fixtures. The lighting fixtures may be instructed to continue operating until further instructions changing the operation thereof are received.

One aspect of the present invention relates to a method for use in controlling lighting fixtures. The method may include determining changes in operation of one or more of the lighting fixtures and preventing broadcasting of a command stream associated with controlling operations of the lighting fixtures until changes in the operation thereof are determined.

The above features and advantages, along with other features and advantages of the present invention, are readily apparent from the following detailed description of the invention when taken in connection with the accompanying drawings.

DETAILED DESCRIPTION OF THE PREFERRED EMBODIMENT(S)

Figure 1:
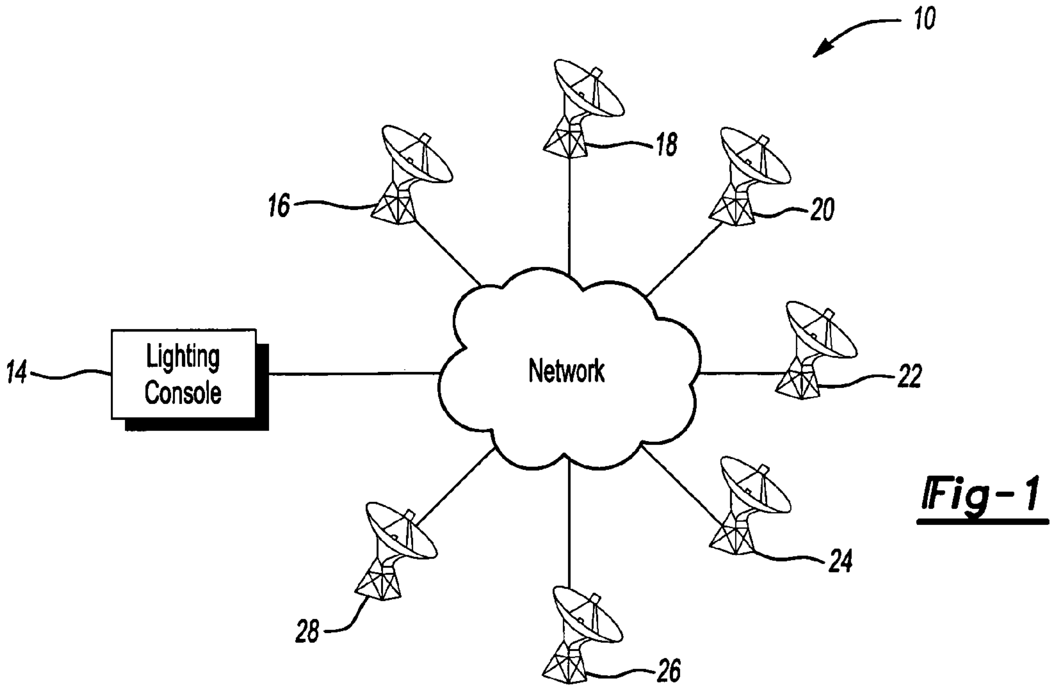
FIG. 1 illustrates a lighting system in accordance with one non-limiting aspect of the present invention.

FIG. 1 illustrates a lighting system 10 in accordance with one non-limiting aspect of the present invention. The system 10 may including a lighting console 14 to control a number of lighting fixtures 16-28. A network 32 may be provided to electronically communicate signals between the lighting console 14 and the lighting fixtures 16-28, such as to facilitate controlling the operation thereof.

The lighting fixtures 16-28 are generally characterized as any unit capable of emitting light or other visible indicators. The lighting fixtures 16-28 may include memories, motors, one or more light sources, processors, and other features for executing any number of operations, including those necessary to execute the operations associated with the present invention.

The lighting console 14 is generally characterized as any unit capable of generating instructions for controlling operations of the lighting fixtures 16-28. The console 14 may include memories, processors, and other features for executing any number operations, including a communication feature to facilitate communications with the lighting fixtures 16-28. The console may be standalone features having applications for use in controlling the lighting fixtures 16-28 and/or the console itself may be a application, such as that run by a computer or other processing means, which may be executed by the computer for directly or indirectly controlling operation of the lighting fixtures 16-28.

The console 14 may be configured to emit a command stream for use in instructing operation of the lighting fixtures 16-28. The command stream may be associated with a continuous or intermittent signal communications. The signals may embody instructions or other features suitable for instructing operation of the lighting fixtures 16-28, such as instructions corresponding with those specified by DMX-512 and other lighting fixture specification and standards.

The command stream may be configured to include a number of channels and corresponding level settings. The lighting fixtures 16-28 may be configured to operate in response to the level settings associated with one or more of the channels. For example, the lighting fixtures 16-28 may be manually or electronically programmed to conform their operation to that specified with the level settings of one or more the channels. The ability to instruct the lighting fixtures as a function of the level settings associated with the channels allows the console to control any number of features and capabilities of the lighting fixtures The console 14 may be configured to receive or store a show schedule or other feature associated with formatting multiple operations of the lighting fixtures 16-28. The show schedule may include a timeline and corresponding channel and level settings to be engaged at particular intervals. Queues, macros, and other features may be included within the show schedule to facilitate changing channel levels and other parameters associated with changing or otherwise varying operation of the lighting fixtures 16-28 to correspond with the show schedule. The console 14 may be configured to analyze the show schedule for changes in operation. For example, the show schedule may require one or more of the lighting fixtures 16-28 to be in a first position at one instance in time and at a second position at another instance in time. The movement required of the lighting fixtures 16-28 to execute this operation may require repeated changes to the level of the channels associated with movement of the lighting fixtures 16-28. If more precise movement is desired, level changes (instructions) may be communicated to the lighting fixtures 16-28 at relatively short intervals, whereas if less precise movement is desired, the level changes may be communicated to the lighting fixtures 16-28 at relatively longer intervals. Each interval associated with a level change may be considered to be a change in operation, i.e. requiring generation of a different instructions to the lighting fixtures 16-28.

The console 14 may be include a software program, logic, or other feature embodied in a computer readable medium or otherwise include thereon to facilitate analysis of the show schedule. In accordance with one non-limiting aspect of the present invention, the console 14 may be configured to output the changes in operation to the lighting fixtures 16-28 as opposed to emitting a command stream having levels for each available channel. This may be advantageous in reducing the amount of bandwidth required to control operations associated with the lighting fixtures.

In more detail, the console 14 may be configured to analyze the show schedule and to determine instances in time where changes in operation of one or more of the lighting fixtures 16-28 is required. The console 14 may then emit signals at those instances in time to change the operation of the relevant lighting fixtures 16-28. The command stream, however, would not include instructions for the other lighting fixtures where current operations are to be maintained. Controlling the console 14 to operate in such a bandwidth limiting manner allows network bandwidth to be used for other operations, such a feedback, quality of service, and other telemetry functions.

Optionally, the lighting fixtures 16-28 may be of the type which require continuous instruction for proper operation. For example, some types of lighting fixtures 16-28 require a continuous stream of instructional signals from the console 14 in order to maintain their current state of operation. An instructional feature (not shown) may be included or otherwise added to these types of lighting fixtures 16-28 to maintain operability in the event that the console 14 limits the instructional set included within the command stream to changes in operation, i.e., such that the commands stream only includes channels and levels for the lighting fixtures 16-28 which are to change operations.

The instructional feature may be configured to continuously emit the previous set of instructions (channels and levels) to the lighting fixtures 16-28 until new instructions are received. This allows the type of lighting fixtures 16-28 requiring real-time instruction to maintain operation in the absence of applicable instructions being received from the console 14, i.e. instructions applicable to that particular lighting fixture—as described above, some of the lighting fixtures 16-28 may be programmed to accept signals associated with a particular channel, and if there are no changes to that channel, those channels may not be included in the signals transmitted from the console.

Optionally, the instructional feature may be included as an add-on device to the lighting fixtures 16-28, such as dongle. The dongle may be configured with suitable interfaces and features to support communications with the console 14 and lighting fixtures 16-28. The dongle may be configured for bi-directional communication and to manipulate signals associated with the console to a format suitable for controlling operation of the lighting fixtures.

One dongle may be associated with a single corresponding lighting fixture 16-28 and/or one dongle may be configured to operate with multiple lighting fixtures 16-28. The dongle may include features for facilitating wireless and wireline communications with the console 14 and lighting fixtures 16-28. The dongle may also be configured to translate or otherwise convert signals from one to protocol or language to another, such as if wireless signals are received from the console and wireline signals are required by the lighting fixtures.

As described above, the ability of the console to conserve bandwidth allows the present invention to perform other operations and to establish other communications with the lighting console 14 which were previously difficult or impossible to achieve. In accordance with one non-limiting aspect of the present invention, the console 14 may be configured to verify operation associated with lighting fixtures 16-28.

The console 14 may be configured to verify operations of the lighting fixtures 16-28 by requesting a current state of the lighting fixtures 16-28 and comparing those states against desired operation states. For example, the console 14 may be configured to compare the current operating state of one or more of the lighting fixtures 16-28 against an operation state specified in the show schedule. If the operating state deviates from that desired by the show schedule, the console 14 may be configured to execute any number of operations as a function thereof.

The console 14 may be configured to issue an alarm, alert, or other warning to a show operator if one or more of the lighting fixtures 16-28 is operating in an undesirable manner. The warning may be displayed on a graphical user interface or other features associated with the console 14 and/or it may be sent via email or otherwise logged for subsequent analysis.

The console 14 may be configured to take corrective action if one or more of the lighting fixtures 16-28 is operating in an undesirable manner. The corrective action may comprise any number of operations, depending on the state of the lighting fixtures 16-28. For example, if the lighting fixtures 16-28 are completely inoperable or otherwise unsuitable for executing the desired operation, another lighting fixture 16-28 may be controlled to cover its operation and/or the entire show may be stopped, such as if the one or more of the inoperable lighting fixtures 16-28 are critical to the operation thereof.

The corrective action may also comprise resetting or homing one or more of the lighting fixtures 16-28. The may include resetting the memories and other logical features and motors of the lighting fixtures to a previous or home state. The homing may be used return the lighting fixtures 16-28 back to a default setting and to clear a memory or buffer overrun. This can be helpful to "zero out" the lighting fixtures 16-28 to a baseline position from which operability may be restored. The homing operation may also be used to spin the lighting fixtures 360 degrees to a default position such that the fixtures 16-28 are at same spot on the network—returning to a central starting point.

The corrective action may include re-broadcasting the instructions to the corresponding lighting fixtures 16-28. In some cases, the operational interrupt or failure may be simply caused by the lighting fixture 16-28 failing to execute an operation even though the lighting fixture 16-28 is otherwise operating properly. By simply re-broadcasting the instructions to the effect lighting fixtures 16-28, the desired operation may be corrected.

Optionally, further corrective action can be combined with one or more of the above-identified actions. For example, with respect to homing or otherwise resetting one or more of the lighting fixtures 16-28, additional instructions may be generated to restart the show or start the show over from another period in time, such as at the time that the interrupt occurred.

The console 14 may be configured to execute the foregoing feedback and quality of service operations during transmission of the command stream and/or during non-transmission periods of the command stream. This may require the console 14 and the lighting fixtures 16-28 to include corresponding communication capabilities. For example, if the foregoing telemetry based operations are executed during periods when the command stream is not being broadcasted, the console and lighting fixtures may not need to support duplex operations, however, if the command stream and telemetry based operations are simultaneously being executed, the console and lighting fixtures may be configured to support duplex operations.

Figure 2:
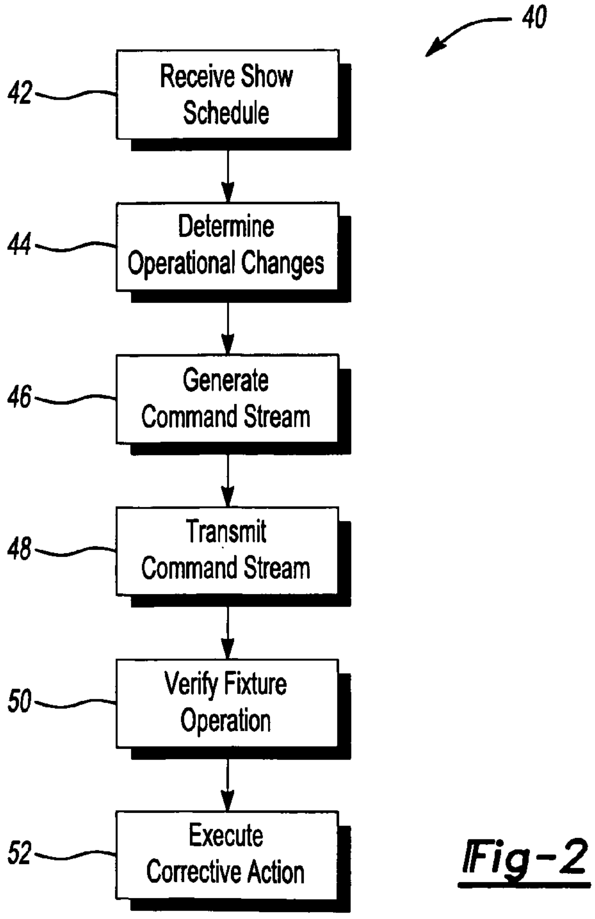
FIG. 2 illustrates a flowchart of a method of controlling lighting fixtures in accordance with one non-limiting aspect of the present invention.

FIG. 2 illustrates a flowchart 40 of a method of controlling lighting fixtures 16-28 in accordance with one non-limiting aspect of the present invention. The method associated with the flowchart 40 may be embodied in a computer readable medium, software application, or other logically function element to execute the operation described below. The method may be executed through operation of the console 14 and lighting fixtures 16-28 and require each such feature to be configured or otherwise suitably arranged to support the operations described below.

Block 42 relates to the console 14 receiving a lighting show schedule or other program having instructions for controlling operations of the lighting fixtures 16-28. The show schedule generally includes a listing of positions, operation states, feature control, and other parameters associated with the operating capabilities of the lighting fixtures 16-28. This parameters may then be arranged according to a time-based or event-based schedule to define a lighting show.

While described with respect to controlling the lighting fixtures 16-28 as a function of parameters provided by a lighting show schedule, the present invention is not intended to be so limited. The show schedule is one means for determining the show parameters and other means are contemplated. For example, the lighting show may be controlled based on user inputs to the console or another show controller, such as the type where an operator tunes knobs and switches to control operation parameters of the lighting fixtures.

Block 44 relates to determining operational changes in the show schedule. The operational changes, as described above, relate to any changes in the operation or operating parameter of the lighting fixtures 16-28. The operation changes may be determined automatically by analyzing the show schedule and/or as a function of inputs received from a show operator, such as through the above-described show controller.

Block 46 relates to generating a command stream to include instructions suitable for executing the operations associated with the operational changes. This may include generating a command stream having instructions for the lighting fixtures 16-28 included within the lighting system 10 having operational changes. The control stream may include instructions for one or more of the lighting fixtures 16-28. For example, in some applications, it may be advantageous to include instructions for all controlled lighting fixtures 16-28, and in other applications, it may be advantageous to include instructions only for the lighting fixtures 16-28 having operational changes.

Block 48 relates to broadcasting the command steam to the lighting fixtures 16-28. The command stream may be broadcasted through a common bus or network to all of the lighting fixtures and/or broadcasted directly to the lighting fixtures 16-28 corresponding with the instructions therein. The command stream may be broadcasted over wireline and/or wireless communication mediums.

Block 50 relates to controlling operation of the lighting fixtures 16-28 as a function of the instructions included within the command stream. This may include the lighting fixtures 16-28 having instructions included within the commands stream for deciphering the instructions and performing the operations associated therewith. Optionally, this may further include controlling one or more of the instructional feature to provide instructions signals to the lighting fixtures 16-28 which have been excluded from the command stream, i.e. those which having operations which are remaining constant. As described above, the use of the instructional feature may be required in environments where the lighting fixtures 16-28 require a constant stream of instructions for proper operation.

Block 50 relates to verifying operation of the lighting fixtures 16-28. The operation may be verified based on telemetry information received by the console 14 from the lighting fixtures 16-28. The verification may include nay number of operations and functions associated with confirming the current status of the lighting fixture 16-28 corresponds with a desired status. Signals and other information may be received and/or requested from the lighting fixtures 16-28 to execute the verification process, as described above in more detail.

The verification may also include verifying other operating states of the lighting fixtures 16-28. For example, the operational states may related to assessing run-time, temperature, and other states associated with the viability of the lighting fixtures. This information may stored in a database or other features for subsequent analysis and record keeping. The data may be compiled into trends and other reports for use in assessing future operational capabilities of the lighting fixtures.

Block 52 relates to taking corrective action if one or more of the operations are unverified and/or if the telemetry data indicates potential issues with future operational capabilities of the lighting fixtures 16-28. This may include any number of features and controlling the lighting fixtures 16-28 to execute any number of operations. For example, the corrective action may include re-broadcasting of one or more instructions, generating an alarm or an alert, logging an error condition, homing or resetting one or more of the lighting fixtures 16-28, and controlling operations of one or more of the other lighting fixtures 16-28 to cover improper operations of one or more other lighting fixtures 16-28.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A lighting system, the system comprising:

a number of lighting fixtures:

a lighting control application configured to intermittently emit instructional signals for instructing operation of the lighting fixtures;

one or more instructional features for repeating instructional signals received from the lighting control application into the continuous stream of instructional signals used to instruct the lighting fixtures;

wherein the application is configured to emit telemetry signals for use in verifying operation of one of more of the lighting fixtures; and wherein the application is configured to take corrective action based on whether operation of the lighting fixtures is verified, wherein the corrective action includes either returning a non-verified lighting fixture to a home position or adjusting control of the other lighting fixtures to compensate for losing control of the non-verified lighting fixture.

2. A method for use in controlling lighting fixtures that require a continuous stream of instructions in order to be maintained in a non-homed state, the method comprising:

issuing a non-continuous stream of instructions to the lighting fixtures, the non-continuous stream of instructions specifying desired non-homed states for the lighting fixtures; and repeating the non-continuous stream of instructions in a manner sufficient to provide the lighting fixtures with the continuous stream of instructions needed to maintain the lighting fixtures in the non-homed state specified in the non-continuous stream of instructions.

3. The method of claim 2 further comprising limiting broadcasting of the non-continuous stream of instructions to the lighting fixtures having operations which are to be changed.

4. The method of claim 2 further comprising verifying proper execution of the non-continuous stream of instructions and generating an alert upon failure to verify execution of the non-continuous stream of instructions.

5. The method of claim 2 further comprising re-broadcasting the non-continuous stream of instructions upon failure to verify that the lighting fixtures are maintained in the non-homed state specified in the non-continuous stream of instructions.

6. The method of claim 5 further comprising logging an error message upon failure to verify execution of the instructions associated with the non-continuous stream of instructions.

7. The method of claim 5 further comprising homing one or more of the fixtures upon failure to verify execution of the non-continuous stream of instructions.

8. The method of claim 5 further comprising adjusting operation of one or more of the lighting fixtures upon failure to verify execution of the non-continuous stream of instructions.

9. The method of claim 2 further comprising analyzing a show schedule for changes in operation and limiting the non-continuous stream of instructions to instructions associated with the changes in operation.

10. The method of claim 2 further comprising configuring the lighting fixtures to return to a homed state if the continuous stream of instructions is not received.

11. The method of claim 2 further comprising converting the non-continuous stream of instructions to the continuous stream of instructions with one or more devices remotely located from a lighting console used to issue the non- continuous stream of instructions.

12. A lighting system comprising:

a number of lighting fixtures configured to execute theatrical lighting operations, wherein the lighting fixtures have a homed state from which the lighting fixtures are controllable to one or more other non-homed states as long as the lighting fixtures receive a continuous stream of instructions instructing the light fixtures to be at one of the non-home states;

a central controller configured to intermittently emit instructions used to instruct each of the lighting fixtures to one of the non-home states;

a repeater configured to continuously repeat the intermittent instructions received from the controller, the repeater repeating the instructions to provide the continuous stream of instructions necessary to instruct the lighting fixtures to be at one of the non-home states; and wherein the controller limits the emitted instructions to instructional changes associated with changing the non-home state of the lighting devices to another non-home state or back to the homed state such that the controller relies on the repeater to repeat the instructional changes until a new instructional change is received, allowing the lighting fixtures to continue to operate at the last instructed state until the controller issues the new instructional change.

13. The system of claim 12 wherein the lighting fixtures return to the home state if the continuous stream of instructions is not received from the repeater.

14. The system of claim 12 wherein the controller verifies maintenance of the lighting fixtures in the non-homed states with telemetry signals communicated from the controller when the controller is not emitting the signals used to instruct the repeater.

* * * * *